(12) United States Patent
Lim et al.

(10) Patent No.: US 11,440,429 B2
(45) Date of Patent: Sep. 13, 2022

(54) VEHICLE BATTERY CHARGING DEVICE AND METHOD

(71) Applicants: Hyundai Motor Company, Seoul (KR); Kia Motors Corporation, Seoul (KR)

(72) Inventors: Kyung Hyun Lim, Hwaseong-si (KR); Young Ung Kim, Gunsan-si (KR); Min Woo Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 145 days.

(21) Appl. No.: 16/952,475

(22) Filed: Nov. 19, 2020

(65) Prior Publication Data

US 2022/0001764 A1 Jan. 6, 2022

(30) Foreign Application Priority Data

Jul. 1, 2020 (KR) .................. 10-2020-0081140

(51) Int. Cl.
*H02J 7/00* (2006.01)
*B60L 53/62* (2019.01)
*B60L 58/12* (2019.01)

(52) U.S. Cl.
CPC .............. *B60L 53/62* (2019.02); *B60L 58/12* (2019.02); *H02J 7/00711* (2020.01); *H02J 7/007194* (2020.01); *H02J 2310/48* (2020.01)

(58) Field of Classification Search
USPC .............................................. 320/109, 137
See application file for complete search history.

(56) References Cited

U.S. PATENT DOCUMENTS

| 3,963,976 | A | * | 6/1976 | Clark | ........................ H02J 7/02 320/DIG. 22 |
| 5,650,710 | A | * | 7/1997 | Hotta | ....................... B60L 58/15 320/155 |
| 6,366,056 | B1 | * | 4/2002 | Podrazhansky | ....... H01M 10/44 320/141 |
| 6,424,157 | B1 | | 7/2002 | Gollomp et al. | |
| 2010/0117604 | A1 | | 5/2010 | Zeier | |

(Continued)

FOREIGN PATENT DOCUMENTS

| CN | 203398811 U | * | 1/2014 |
| EP | 1135840 A2 | | 9/2001 |
| KR | 1020170105672 A | | 9/2017 |

*Primary Examiner* — Samuel Berhanu
(74) *Attorney, Agent, or Firm* — Slater Matsil, LLP

(57) ABSTRACT

A vehicle battery charging device includes a controller configured to generate one of a first activation signal and a second activation signal, based on a start-up signal and a battery state information, a continuous charger configured to output first electric energy of a constant voltage level, based on the first activation signal, a pulse charger configured to alternately output a charging voltage and a discharge voltage as second electric energy depending on a preset ratio, based on the second activation signal, a battery configured to continuously charge by receiving the first electric energy or to pulse-charge by receiving the second electric energy, and a battery state detector configured to detect a state of the battery and to output the detected state of the battery as the battery state information.

19 Claims, 5 Drawing Sheets

(56) References Cited

U.S. PATENT DOCUMENTS

2010/0164430 A1* 7/2010 Lu .................... H02J 7/0016
   320/152
2014/0176052 A1* 6/2014 Powell ................ H02J 7/00
   320/138

* cited by examiner

| CHARGING METHOD | CHARGING TIME | CHARGING VOLTAGE | DISCHARGE CURRENT | CHARGING PERIOD | DISCHARGE PERIOD | DISCHARGE RATE | NUMBER OF RATE REPETITIONS | TOTAL ACCUMULATED AMOUNT | CAPACITY AFTER CHARGING | ACTUAL CHARGING AMOUNT | CHARGING EFFICIENCY | FULL CHARGE CAPACITY | RESIDUAL IRREVERSIBLE SULFATION | SULFATION REDUCTION RATE |
|---|---|---|---|---|---|---|---|---|---|---|---|---|---|---|
| CONSTANT VOLTAGE | 120min | 14.8V | | | | | | 26.27Ah | 64.1Ah | 18.6Ah | 71% | 64.0Ah | 10.8Ah | 63.2% |
| PULSE | 120min | 14.8V | -30A | 760s | 40s | 5% | 9TIMES | 25.94Ah | 67.1Ah | 20.3Ah | 78% | 68.2Ah | 7.8Ah | 73.3% |
| PULSE | 120min | 14.8V | -30A | 570s | 30s | 5% | 12TIMES | 26.12Ah | 65.9Ah | 19.8Ah | 76% | 66.0Ah | 9.3Ah | 68.0% |
| PULSE | 120min | 14.8V | -30A | 380s | 20s | 5% | 18TIMES | 26.01Ah | 65.9Ah | 20.1Ah | 77% | 66.6Ah | 8.6Ah | 70.5% |
| PULSE | 120min | 14.8V | -30A | 285s | 15s | 5% | 24TIMES | 25.64Ah | 66.1Ah | 20.6Ah | 81% | 70.3Ah | 6.2Ah | 78.6% |
| PULSE | 120min | 14.8V | -30A | 190s | 10s | 5% | 36TIMES | 25.93Ah | 66.9Ah | 20.6Ah | 79% | 68.5Ah | 7.1Ah | 75.8% |
| PULSE | 120min | 14.8V | 30A | 95s | 5s | 5% | 72TIMES | 25.44Ah | 66.2Ah | 19.5Ah | 76% | 66.3Ah | 9.7Ah | 66.7% |

FIG. 4C

VEHICLE BATTERY CHARGING DEVICE AND METHOD

CROSS-REFERENCE TO RELATED APPLICATIONS

This application claims the benefit of Korean Patent Application No. 10-2020-0081140, filed in the Korean Intellectual Property Office on Jul. 1, 2020, which application is hereby incorporated herein by reference.

TECHNICAL FIELD

The present disclosure relates to a charging device and a charging method for a battery provided in a vehicle.

BACKGROUND

In general, a battery has a discharge cycle that converts chemical energy into electric energy and a charging cycle that converts the electric energy into the chemical energy.

When the battery is discharged, water is generated depending on the combination of a sulfate and an electrode plate, so the specific gravity of the battery decreases, and when the battery is charged, the sulfate combined with the electrode plate returns to an electrolyte solution, thus the specific gravity of the battery increases.

As the battery discharges (including self-discharge) during a long period of charge/discharge cycles, the sulfate that has adhered to the electrode plate of the battery does not escape during charging, but is adhered to the electrode plate as it is, which is a sulfation phenomenon.

In the battery, as corrosion of the electrode plate occurs due to the sulfation phenomenon, the life of the battery is shortened, as well as an activation of ionic molecules due to the sulfate adhering to the electrode plate decreases, resulting in a problem of extremely low charging/discharging efficiency.

The problem of such a battery is pointed out as a bigger problem as the number of electric components currently provided in the vehicle as well as a development of electric vehicles increases.

SUMMARY

The present disclosure has been made to solve problems occurring in the prior art while advantages achieved by the prior art are maintained intact.

An embodiment of the present disclosure provides a battery charging device and method capable of increasing a duration of maintaining a durability performance of a battery.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a vehicle battery charging device includes a controller that generates one of a first activation signal and a second activation signal, based on a start-up signal and a battery state information, a continuous charger that outputs first electric energy of a constant voltage level, based on the first activation signal, a pulse charger that alternately outputs a charging voltage and a discharge voltage as second electric energy depending on a preset ratio, based on the second activation signal, a battery that continuously charges by receiving the first electric energy or pulse-charges by receiving the second electric energy, and a battery state detector that detects a state of the battery and outputs the detected state of the battery as the battery state information.

According to another embodiment of the present disclosure, a vehicle battery charging method includes a plurality of charging condition determining steps of determining charging conditions of a battery, based on battery state information, a continuous charging starting step of continuously charging the battery at a constant voltage when any one of the charging conditions of the plurality of charging condition determining steps satisfies a continuous charging condition, and a pulse charging starting step of performing a pulse-charging that alternately provides a charging voltage and a discharge voltage to the battery when all of the charging conditions of the plurality of charging condition determining steps satisfy a pulse charging condition.

BRIEF DESCRIPTION OF THE DRAWINGS

The above and other objects, features and advantages of the present disclosure will be more apparent from the following detailed description taken in conjunction with the accompanying drawings, in which:

FIGS. 4A-4C are diagrams for describing in more detail a battery charging device and method according to an embodiment of the present disclosure.

DETAILED DESCRIPTION OF ILLUSTRATIVE EMBODIMENTS

Figure 1:
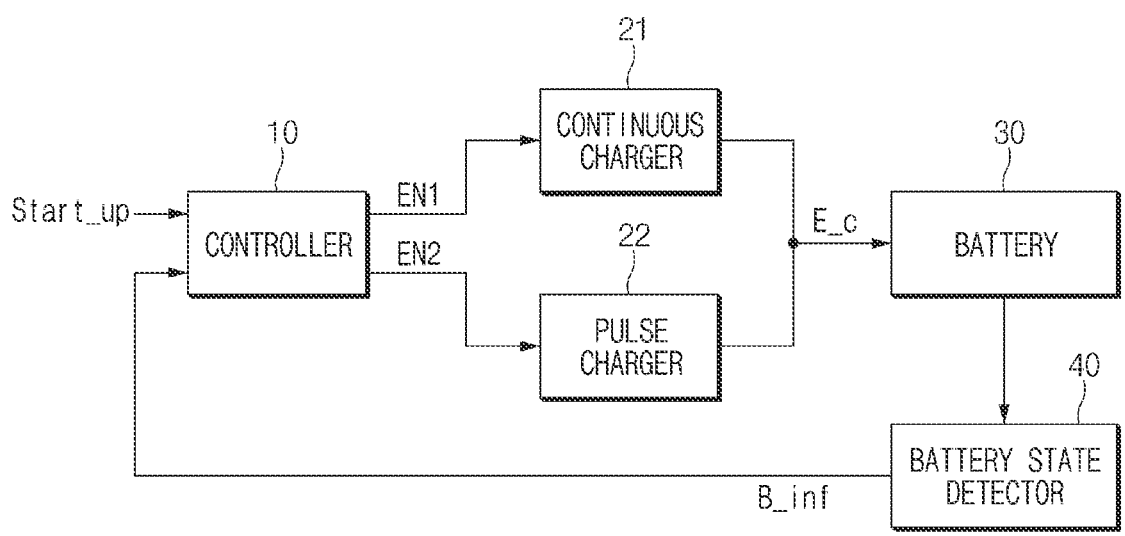
FIG. 1 is a diagram illustrating a configuration of a battery charging device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 3.

FIG. 1 is a diagram illustrating a configuration of a battery charging device according to an embodiment of the present disclosure.

Referring to FIG. 1, a controller 10 according to an embodiment of the present disclosure may be implemented inside a vehicle. In this case, the controller 10 may be integrally formed with the internal control units of the vehicle, or may be implemented as a separate device and may be connected to the control units of the vehicle by a separate connection means.

Referring to FIG. 1, a battery charging device according to an embodiment of the present disclosure may include the controller 10, a continuous charger 21, a pulse charger 22, a battery 30, and a battery state detector 40.

The controller 10 may receive a start-up signal Start_up and battery state information B_inf, and may output one of a first activation signal EN1 and a second activation signal EN2. The battery state information B_inf may include a neglect period of the battery 30, a charging current of the battery 30, a charging amount of the battery 30, a charging time of the battery 30, an electrolyte solution temperature of the battery 30, and an internal resistance of the battery 30.

For example, when the start-up signal Start_up is activated, that is, when the vehicle is started, the controller 10 may transition one of the first activation signal EN1 and the second activation signal EN2 to a high level (a digital level), based on the battery state information B_inf.

Meanwhile, when the start-up signal Start_up is deactivated, the controller 10 may transition both the first activation signal EN1 and the second activation signal EN2 to a low level regardless of the battery state information B_inf.

In this case, when the controller 10 outputs both the first activation signal EN1 and the second activation signal EN2 as the low level, it may be a case (deactivation of the start-up signal Start_up) that charging of the battery 30 is unnecessary or the battery 30 cannot be charged, and when only one of the first activation signal EN1 and the second activation signal EN2 transitions to the high level, it may be a case that the battery 30 needs to be charged.

In the embodiment of the present disclosure, as described above, the case where the battery 30 needs to be charged after the vehicle is started is described as an example, but the present disclosure is not limited thereto.

In more detail, when it is determined that the battery 30 needs to be charged based on the start-up signal Start_up and the battery state information B_inf, the controller 10 may transition one of the first activation signal EN1 and the second activation signal EN2 to the high level.

In this case, when a continuous charging condition is satisfied based on the battery state information B_inf in a state in which the start-up signal Start_up is activated, the controller 10 may transition the first activation signal EN1 of the first activation signal EN1 and the second activation signal EN2 to the high level.

The continuous charging condition may mean a case in which the neglect period of the battery 30 does not exceed a preset number of days, the charging amount of the battery 30 is equal to or greater than a preset value, the temperature of the electrolyte solution of the battery 30 is less than a preset temperature, or the internal resistance of the battery 30 is greater than or equal to a preset resistance value.

Meanwhile, when a pulse charging condition is satisfied based on the battery state information B_inf in the state in which the start-up signal Start_up is activated, the controller 10 may transition the second activation signal EN2 of the first activation signal EN1 and the second activation signal EN2 to the high level.

The pulse charging condition may mean a case in which the neglect period of the battery 30 exceeds the preset number of days, the charging amount of the battery 30 is less than the preset value, the temperature of the electrolyte solution of the battery 30 is greater than or equal to the preset temperature, or the internal resistance of the battery 30 is less than the preset resistance value.

In addition, when it is determined that charging of the battery 30 is unnecessary based on the start-up signal Start_up and the battery state information B_inf, the controller 10 may transition a signal of the high level of the first activation signal EN1 and the second activation signal EN2 to the low level. In this case, both of the first activation signal EN1 and the second activation signal EN2 may be the low level.

When the continuous charging condition is satisfied and the battery 30 is continuously being charged, that is, when the first activation signal EN1 is at the high level, the controller 10 may transition the first activation signal EN1, which is at the high level, to the low level when a continuous charging ending condition is satisfied, based on the battery state information B_inf.

The continuous charging ending condition may be a case in which the charging current is less than a set current value for a preset time, the charging amount and the charging time of the battery 30 exceed a preset first charging amount and a preset first charging time, the charging amount of the battery 30 exceeds a preset second charging amount, or the charging time of the battery 30 exceeds the preset second charging time. In this case, the preset first charging amount may be a value less than the preset second charging amount, and the preset first charging time may be shorter than the preset second charging time.

When the pulse charging condition is satisfied and the battery 30 is being pulse charged, that is, when the second activation signal EN2 is at the high level, the controller 10 may transition the second activation signal EN2, which is at the high level, to the low level when the pulse charging ending condition is satisfied, based on the battery state information B_inf.

The pulse charging ending condition may be a case in which the battery 30 is charged more than a preset charging amount.

The continuous charger 21 may continuously provide electric energy E_c to the battery 30 during a period in which the first activation signal EN1 is at the high level.

The pulse charger 22 may discontinuously provide electric energy E_c to the battery 30 during a period in which the second activation signal EN2 is at the high level.

In this case, the electric energy E_c provided by the continuous charger 21 and the pulse charger 22 to the battery 30 may be a voltage for charging the battery 30.

In addition, the continuous charger 21 may provide the electric energy E_c of one preset voltage level (a constant voltage level) to the battery 30 during the period in which the first activation signal EN1 is at the high level.

The pulse charger 22 may alternately provide the electric energy E_c of two preset voltage levels to the battery 30 during the period in which the second activation signal EN2 is at the high level.

For example, the pulse charger 22 may alternately provide the electric energy E_c of a first voltage level and the electric energy E_c of a second voltage level to the battery 30, based on a preset ratio during the period in which the second activation signal EN2 is at the high level.

The battery 30 may store the electric energy E_c provided from the continuous charger 21 or the pulse charger 22 as chemical energy. In addition, the battery 30 may output the stored chemical energy as the electric energy E_c.

When the battery 30 is discharged, as water is generated depending on the combination of the sulfate and the electrode plate, the specific gravity is lowered, and when the battery 30 is charged, the sulfate combined with the electrode plate is reduced to the electrolyte solution, thereby increasing the specific gravity.

The battery state detector 40 may detect battery states such as the neglect period, the charging current, the charging amount, the charging time, the temperature of the electrolyte solution, and the internal resistance of the battery 30 and may output the detected battery states as the battery state information B_inf.

Figure 2:
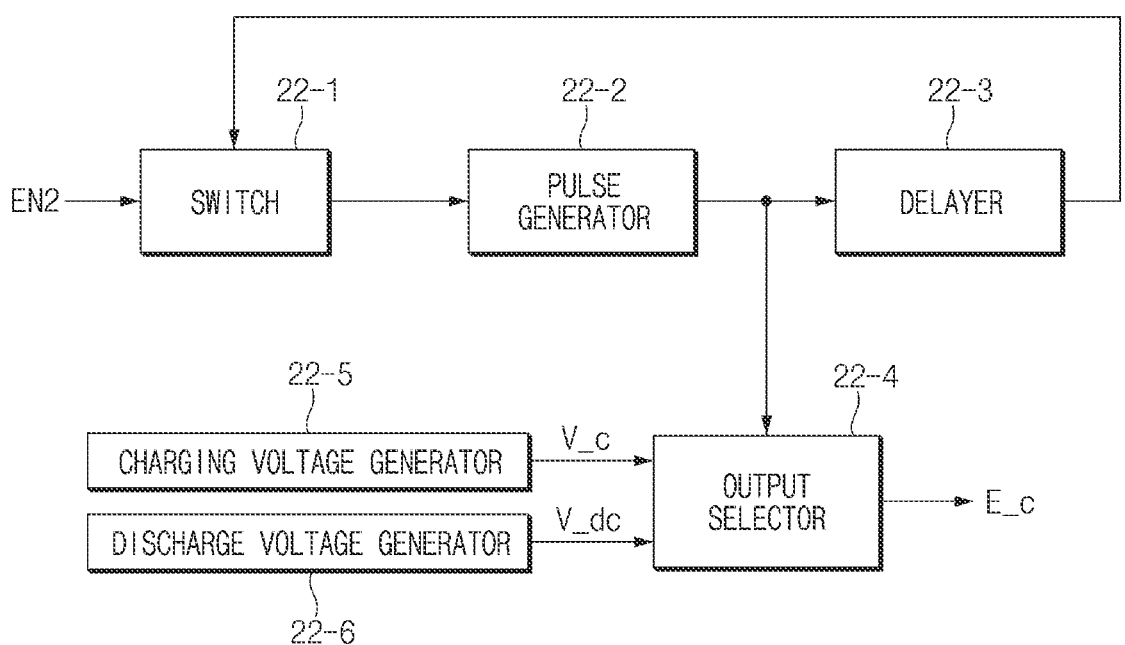
FIG. 2 is a diagram illustrating a configuration of a pulse charger according to an embodiment of the present disclosure.

FIG. 2 is a diagram illustrating a configuration of a pulse charger according to an embodiment of the present disclosure.

Referring to FIG. 2, the pulse charger 22 may include a switch 22-1, a pulse generator 22-2, a delayer 22-3, an output selector 22-4, a charging voltage generator 22-5, and a discharge voltage generator 22-6.

When the second activation signal EN2 is at a high level, the switch 22-1 may transfer an output signal of the delayer 22-3 to the pulse generator 22-2, and when the second activation signal EN2 is at the low level, the switch 22-1 may cut off the output signal of the delayer 22-3 from being input to the pulse generator 22-2.

When the low level signal is input, the pulse generator 22-2 may generate a pulse that transitions to the high level for a first preset time. In this case, the first preset time may be a time that may be arbitrarily set by a user.

The delayer 22-3 may receive an output signal of the pulse generator 22-2, may delay the output signal of the pulse generator 22-2 for a second preset time, and may invert and output the delayed output signal. In this case, the second preset time may be a time that may be arbitrarily set by the user.

The output selector 22-4 may output one of a charging voltage V_c and a discharge voltage V_dc as the electric energy E_c, based on a level of the output signal of the pulse generator 22-2.

The charging voltage generator 22-5 may generate the charging voltage V_c. In this case, a voltage level of the charging voltage V_c may be 14.8 volts.

The discharge voltage generator 22-6 may generate the discharge voltage V_dc. In this case, a voltage level of the discharge voltage V_dc may be 12 volts.

An operation of the pulse charger 22 configured as described above according to an embodiment of the present disclosure will be described as follows.

When the second activation signal EN2 is at the low level, the switch 22-1 may cut off the output of the delayer 22-3 from being provided to the pulse generator 22-2.

When the switch 22-1 cuts off the output of the delayer 22-3 from being input to the pulse generator 22-2, the pulse generator 22-2 may stop generating the pulse.

Meanwhile, when the second activation signal EN2 is at the high level, the switch 22-1 may provide the output of the delayer 22-3 to the pulse generator 22-2.

When the output signal of the delayer 22-3, which is at the low level, is input to the pulse generator 22-2, the pulse generator 22-2 may generate a pulse that maintains the high level for the first preset time.

The delayer 22-3 may delay the output signal of the pulse generator 22-2 for the second preset time, and may invert and output the delayed output signal to the switch 22-1. In this case, since the output signal of the delayer 22-3 is that a pulse output from the pulse generator 22-2 is delayed for the second preset time and inverted, after the pulse generator 22-2 outputs a pulse maintaining the high level for the first preset time, when the second preset time elapses, the pulse generator 22-2 may receive a signal of the low level again and may output a pulse maintaining the high level for the first preset time.

That is, the pulse generator 22-2 may generate the pulse maintaining the high level for the first preset time, and when the second preset time elapses while maintaining the low level, the pulse generator 22-2 may repeatedly generate the pulse maintaining the high level for the first preset time.

In summary, the pulse generator 22-2 may generate a signal that maintains the high level for the first preset time and the low level for the second preset time in the period in which the second activation signal EN2 is at the high level.

The output selector 22-4 may provide the charging voltage V_c as the electric energy E_c to the battery 30 in the period in which the output signal of the pulse generator 22-2 is at the high level, and the output selector 22-4 may provide the discharge voltage V_dc as the electric energy E_c to the battery 30 in the period in which the output signal of the pulse generator 22-2 is at the low level.

Figure 3:
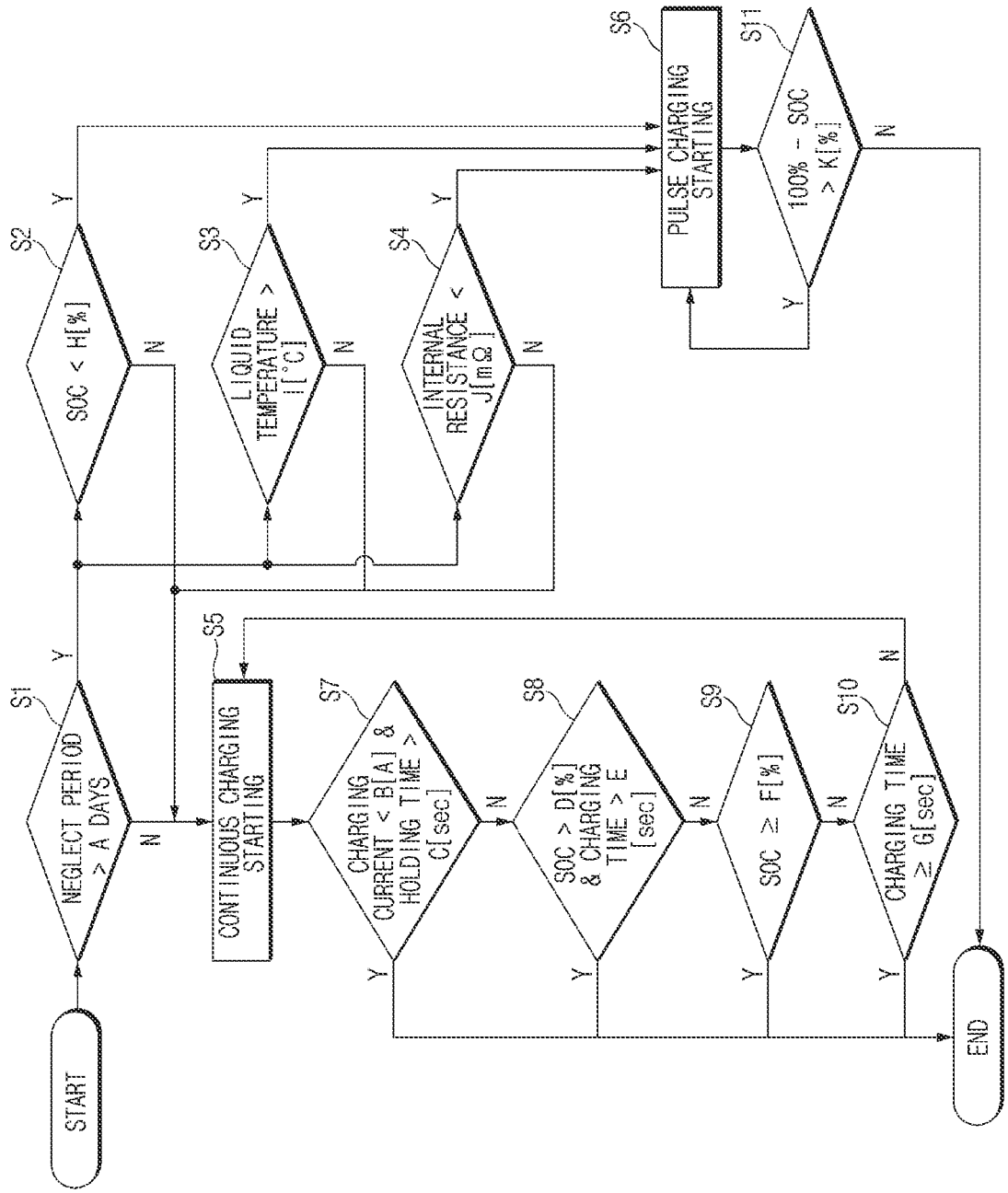
FIG. 3 is a flowchart illustrating a battery charging method according to an embodiment of the present disclosure.

FIG. 3 is a flowchart illustrating a battery charging method according to an embodiment of the present disclosure.

Referring to FIG. 3, a battery charging method according to an embodiment of the present disclosure may include first to fourth charging condition determining steps S1, S2, S3, and S4, a continuous charging starting step S5, a pulse charging starting step S6, first to fourth continuous charging ending condition determining steps S7, S8, S9, and S10, and a pulse charging ending determining step S11.

The first charging condition determining step S1 may allow the continuous charging starting step S5 or the second to fourth charging condition determining steps S2, S3, and S4 to be performed depending on whether the neglect period of the battery 30 exceeds the preset period (A days).

For example, the first charging condition determining step S1 may allow the continuous charging starting step S5 to be performed when the neglect period of the battery 30 does not exceed the preset period (N at S1).

Meanwhile, the first charging condition determining step S1 may allow the second to fourth charging condition determining steps S2, S3, and S4 to be performed when the neglect period of the battery 30 exceeds the preset period (Y at S1).

The second charging condition determining step S2 may allow the continuous charging starting step S5 to be performed or a pulse charging starting step S6 to be selected depending on a comparison of the charging amount (State Of Charge: SOC) of the battery 30 and the preset charging amount (H [%]).

For example, the second charging condition determining step S2 may allow the continuous charging starting step S5 to be performed when the charging amount of the battery 30 is greater than the preset charging amount (H [%]) (N at S2).

Meanwhile, the second charging condition determining step S2 may allow the pulse charging starting step S6 to be selected when the charging amount of the battery 30 is less than the preset charging amount (H [%]) (Y at S2).

The third charging condition determining step S3 may allow the continuous charging starting step S5 to be performed or the pulse charging starting step S6 to be selected depending on a comparison of the electrolyte solution temperature (a liquid temperature) of the battery 30 and the preset temperature (I [° C.]). In this case, in the third charging condition determining step S3, the reason of determining whether or not to pulse charge the battery 30, based on the electrolyte solution temperature of the battery 30, is because a pulse charging efficiency of the battery 30 may be lowered when the electrolyte solution temperature is less than the preset temperature (I [° C.]).

For example, the third charging condition determining step S3 may allow the continuous charging starting step S5 to be performed when the electrolyte solution temperature of the battery 30 is less than the preset temperature (N at S3).

Meanwhile, the third charging condition determining step S3 may allow the pulse charging starting step S6 to be selected when the electrolyte solution temperature of the battery 30 is greater than the preset temperature (Y at S3).

The fourth charging condition determining step S4 may allow the continuous charging starting step S5 to be performed or the pulse charging starting step S6 to be selected depending on a comparison of the internal resistance of the battery 30 and the preset resistance (J[mΩ]). In this case, in the fourth charging condition determining step S4, the reason of determining whether or not to pulse charge the battery 30, based on the battery internal resistance, is because the pulse charging efficiency of the battery 30 may be lowered as the internal resistance of the battery 30 increases.

For example, the fourth charging condition determining step S4 may allow the continuous charging starting step S5 to be performed when the internal resistance of the battery 30 is greater than the preset resistance (N at S4).

Meanwhile, the fourth charging condition determining step S4 may allow the pulse charging starting step S6 to be selected when the internal resistance of the battery 30 is less than the preset resistance (Y at S4).

Each of the first to fourth charging condition determining steps S1, S2, S3, and S4 may allow the continuous charging starting step S5 to be performed.

For example, the continuous charging starting step S5 may be performed based on the determination result (N) of the first charging condition determining step S1, the determination result (N) of the second charging condition determining step S2, the determination result (N) of the third charging condition determining step S3, or the determination result (N) of the fourth charging condition determining step S4.

When the continuous charging starting step S5 is performed, the battery 30 may be charged by receiving the electric energy E_c of one preset voltage level.

The pulse charging starting step S6 may be performed only when all of the second to fourth charging condition determining steps S2, S3, and S4 select the pulse charging starting step S6.

For example, when the pulse charging starting step S6 is selected based on the determination result (Y) of the second charging condition determining step S2, the determination result (Y) of the third charging condition determining step S3, and the determination result (Y) of the fourth charging condition determining step S4, the pulse charging starting step S6 may be performed.

When the pulse charging starting step S6 is performed, the battery 30 may be charged by receiving electric energy E_c of two preset voltage levels depending on the preset ratio.

After the continuous charging starting step S5 is performed, when one of the first to fourth continuous charging ending determining steps S7, S8, S9, and S10 satisfies the continuous charging ending condition, the charging of the battery 30 may be ended.

The first continuous charging ending determining step S7 may allow the charging of the battery 30 to be ended when the charging current less than the preset current amount (B [A]) is provided to the battery 30 for more than the preset time (a holding time, C [sec]) (Y at S7).

Meanwhile, the first continuous charging ending determining step S7 may allow the second continuous charging ending determining step S8 to be performed when the charging current greater than the preset current amount (B [A]) is provided to the battery 30 or the charging time of the battery 30 is less than the preset time (the holding time, C [sec]) (N at S7).

The second continuous charging ending determining step S8 may allow the charging of the battery 30 to be ended when the charging amount (SOC) of the battery 30 is maintained for the preset time (the charging time, E [sec]) above the preset charging amount (D [%]) (Y at S8).

Meanwhile, the second continuous charging ending determining step S8 may allow the third continuous charging ending determining step S9 to be performed when the charging amount (SOC) of the battery 30 is less than the preset charging amount (D [%]) or the charging time of the battery 30 is less than the preset time (charging time, E [sec]) (N at S8).

The third continuous charging ending determining step S9 may allow the charging of the battery 30 to be ended when the charging amount (SOC) of the battery 30 is equal to or greater than the preset charging amount (F [%]) (Y at S9).

Meanwhile, the third continuous charging ending determining step S9 may allow the fourth continuous charging ending determining step S10 to be performed when the charging amount (SOC) of the battery 30 is less than the preset charging amount (F [%]) (N at S9).

The fourth continuous charging ending determining step S10 may allow the charging of the battery 30 to be ended when the charging time of the battery 30 is equal to or greater than the preset time (G [sec]) (Y at S10).

Meanwhile, the fourth continuous charging ending determining step S10 may allow the continuous charging starting step S5 to be performed when the charging time of the battery 30 is less than the preset time (G [sec]) (N at S10).

In this case, the preset charging amount (D [%]) of the second continuous charging ending determining step S8 may be set to a value less than the preset charging amount (F [%]) of the third continuous charging ending determining step S9. The preset time (E [sec]) of the second continuous charging ending determining step S8 may be set to a time less than the preset time (G [sec]) of the fourth continuous charging ending determining step S10.

The pulse charging ending determining step S11 may allow the pulse charging starting step S6 to be performed when a difference between the fully charged charging amount (100 [%]) and the charging amount (SOC) of the battery 30 is greater than the preset charging amount (K [%]) (Y at S11).

Meanwhile, the pulse charging ending determining step S11 may allow the charging of the battery 30 to be ended when the difference between the fully charged charging amount (100 [%]) and the charging amount (SOC) of the battery 30 is less than the preset charging amount (K [%]) (N at S11).

As described above, a vehicle battery charging device and method according to embodiments of the present disclosure have the advantage of preventing degradation of the battery and extending the life of the battery, by selecting one of the continuous charging method and the pulse charging method, based on the neglect period of the battery, the charging amount of the battery, the electrolyte solution temperature of the battery, and the internal resistance of the battery, and by charging the battery in the selected charging method.

Figure 4A:
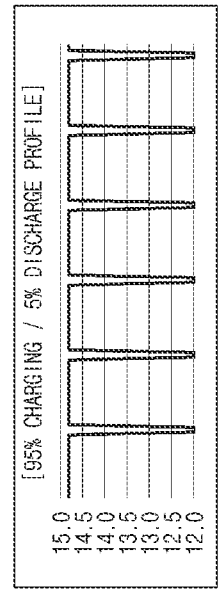
Figure 4B:
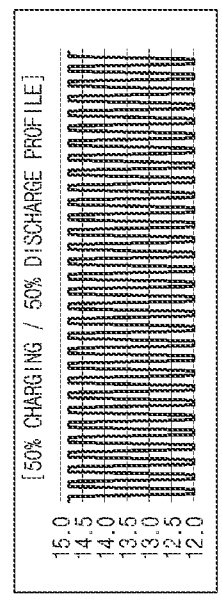

FIGS. 4A-4C are diagrams for describing in more detail a battery charging device and method according to an embodiment of the present disclosure.

Referring to FIG. 4A, in the battery charging device and method of embodiments of the present disclosure, it may be seen that the charging efficiency of the pulse charging is greater than that of the continuous charging (the constant voltage charging), and the charging efficiency is greater when the discharging rate is 5% than that when the discharging rate is 10%.

FIG. 4B illustrates a pulse output from the pulse generator 22-2 of FIG. 2, the first preset time of the pulse generator 22-2 may be the charging time, and the second preset time of the delayer 22-3 may be a discharging time.

FIG. 4C illustrates that the charging efficiency may be the best when the ratio of the charging period (the charging time) and the discharging period (the discharging time) is 95:5, that is, when the charging period is 285 and the discharge period is 15.

In addition, when the ratio of the charging and discharging is 95:5, the sulfation (the sulfation phenomenon) reduction rate is the highest, and the charging efficiency may be high.

Since embodiments of the present disclosure may reduce some of the sulfation adhered to the electrode plate due to the sulfation phenomenon through the charging method using a low-frequency pulse, not only the durability performance of the battery may be maintained, but also the life of the battery may be extended.

In addition to this, various effects that are directly or indirectly identified through this document may be provided.

The above description is only illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A vehicle battery charging device comprising:
a controller configured to generate one of a first activation signal and a second activation signal, based on a start-up signal and a battery state information;
a continuous charger configured to output first electric energy of a constant voltage level, based on the first activation signal;
a pulse charger configured to alternately output a charging voltage and a discharge voltage as second electric energy depending on a preset ratio, based on the second activation signal;
a battery configured to continuously charge by receiving the first electric energy or to pulse-charge by receiving the second electric energy; and
a battery state detector configured to detect a state of the battery and to output the detected state of the battery as the battery state information.

2. The device of claim 1, wherein the state of the battery includes at least one of a neglect period of the battery, a charging current of the battery, a charging amount of the battery, a charging time of the battery, a temperature of an electrolyte solution of the battery, and an internal resistance of the battery.

3. The device of claim 2, wherein the controller is configured to:
transit one of the first and second activation signals to a high level, based on the battery state information when the start-up signal is activated; and
transit both of the first and second activation signals to a low level regardless of the battery state information when the start-up signal is deactivated.

4. The device of claim 3, wherein, based on the battery state information when the start-up signal is activated, the controller is configured to transit the first activation signal of the first and second activation signals to the high level when the controller determines:
the neglect period of the battery is shorter than a preset period;
the charging amount of the battery is greater than or equal to a preset value in a state in which the neglect period of the battery is longer than the preset period;
the temperature of the electrolyte solution of the battery is less than a preset temperature; or
the internal resistance of the battery is more than a preset resistance value.

5. The device of claim 3, wherein, based on the battery state information when the start-up signal is activated, the controller is configured to transit the second activation signal of the first and second activation signals to the high level when the controller determines:
the neglect period of the battery is longer than a preset period;
the charging amount of the battery is less than a preset value;
the temperature of the electrolyte solution of the battery is greater than a preset temperature; and
the internal resistance of the battery is less than a preset resistance value.

6. The device of claim 1, wherein the controller is configured to:
transit one of the first and second activation signals to a high level, based on the battery state information when the start-up signal is activated; and
transit both of the first and second activation signals to a low level regardless of the battery state information when the start-up signal is deactivated.

7. The device of claim 6, wherein, based on the battery state information when the start-up signal is activated, the controller is configured to transit the first activation signal of the first and second activation signals to the high level when the controller determines:
a neglect period of the battery is shorter than a preset period;
a charging amount of the battery is greater than or equal to a preset value in a state in which the neglect period of the battery is longer than the preset period;
a temperature of an electrolyte solution of the battery is less than a preset temperature; or
an internal resistance of the battery is more than a preset resistance value.

8. The device of claim 6, wherein, based on the battery state information when the start-up signal is activated, the controller is configured to transit the second activation signal of the first and second activation signals to the high level when the controller determines:
  a neglect period of the battery is longer than a preset period;
  a charging amount of the battery is less than a preset value;
  a temperature of an electrolyte solution of the battery is greater than a preset temperature; and
  an internal resistance of the battery is less than a preset resistance value.

9. The device of claim 1, wherein the pulse charger is configured to alternately output the charging voltage and the discharge voltage as the second electric energy depending on the preset ratio when the second activation signal is at a high level.

10. The device of claim 9, wherein the pulse charger includes:
  a switch configured to transfer an output signal of a delayer to a pulse generator, based on the second activation signal;
  the pulse generator configured to receive the output signal of the delayer from the switch and to generate a pulse maintaining the high level for a first preset time;
  the delayer configured to delay the pulse for a second preset time, and to invert and output the delayed pulse; and
  an output selector configured to output the charging voltage as the second electric energy when the pulse is at the high level, and to output the discharge voltage as the second electric energy when the pulse is at a low level.

11. A method for charging a vehicle battery, the method comprising:
  performing a plurality of charging condition determining steps of determining charging conditions of a battery, based on battery state information;
  a continuous charging starting step of continuously charging the battery at a constant voltage when any one of the charging conditions of the plurality of charging condition determining steps satisfies a continuous charging condition; and
  a pulse charging starting step of performing a pulse-charging that alternately provides a charging voltage and a discharge voltage to the battery when all of the charging conditions of the plurality of charging condition determining steps satisfy a pulse charging condition.

12. The method of claim ii, wherein the plurality of charging condition determining steps includes:
  a first charging condition determining step of determining whether a neglect period of the battery exceeds a preset period, based on the battery state information;
  a second charging condition determining step of comparing a charging amount of the battery with a preset charging amount, based on the battery state information;
  a third charging condition determining step of comparing a temperature of an electrolyte solution of the battery with a preset temperature, based on the battery state information; and
  a fourth charging condition determining step of comparing an internal resistance of the battery with a preset resistance, based on the battery state information.

13. The method of claim 12, wherein the continuous charging starting step is performed when the neglect period of the battery does not exceed the preset period in the first charging condition determining step, when the charging amount of the battery is greater than the preset charging amount in the second charging condition determining step, when the temperature of the electrolyte solution of the battery is less than the preset temperature in the third charging condition determining step, or when the internal resistance of the battery is greater than the preset resistance in the fourth charging condition determining step.

14. The method of claim 12, wherein the pulse charging starting step is performed when the neglect period of the battery exceeds the preset period in the first charging condition determining step, when the charging amount of the battery is less than the preset charging amount in the second charging condition determining step, when the temperature of the electrolyte solution of the battery is greater than the preset temperature in the third charging condition determining step, and when the internal resistance of the battery is less than the preset resistance in the fourth charging condition determining step.

15. The method of claim ii, further comprising a continuous charging ending step of ending charging of the battery by determining a charging current of the battery, a charging time of the battery, and a charging amount of the battery, based on the battery state information.

16. The method of claim ii, further comprising a pulse charging ending step of ending charging of the battery, based on a charging amount of the battery.

17. A method for charging a vehicle battery, the method comprising:
  determining whether a neglect period of the battery exceeds a preset period;
  comparing a charging amount of the battery with a preset charging amount;
  comparing a temperature of an electrolyte solution of the battery with a preset temperature;
  comparing an internal resistance of the battery with a preset resistance;
  continuously charging the battery at a constant voltage when the neglect period of the battery does not exceed the preset period, when the charging amount of the battery is greater than the preset charging amount, when the temperature of the electrolyte solution of the battery is less than the preset temperature, or when the internal resistance of the battery is greater than the preset resistance; and
  performing a pulse-charging that alternately provides a charging voltage and a discharge voltage to the battery when the neglect period of the battery exceeds the preset period, when the charging amount of the battery is less than the preset charging amount, when the temperature of the electrolyte solution of the battery is greater than the preset temperature, and when the internal resistance of the battery is less than the preset resistance.

18. The method of claim 17, further comprising a continuous charging ending step of ending charging of the battery by determining a charging current of the battery, a charging time of the battery, and the charging amount of the battery.

19. The method of claim 17, further comprising a pulse charging ending step of ending charging of the battery based on the charging amount of the battery.

* * * * *

UNITED STATES PATENT AND TRADEMARK OFFICE
CERTIFICATE OF CORRECTION

PATENT NO. : 11,440,429 B2
APPLICATION NO. : 16/952475
DATED : September 13, 2022
INVENTOR(S) : Kyung Hyun Lim It is certified that error appears in the above-identified patent and that said Letters Patent is hereby corrected as shown below:

In the Claims

Claim 12, Column 11, Line 51; delete "claim ii" and insert --claim 11--.

Claim 15, Column 12, Line 23; delete "claim ii" and insert --claim 11--.

Claim 16, Column 12, Line 28; delete "claim ii" and insert --claim 11--.

Signed and Sealed this
Twenty-fifth Day of October, 2022

Katherine Kelly Vidal
*Director of the United States Patent and Trademark Office*